(No Model.)
J. H. KIRBY.
TETHER.
No. 353,750. Patented Dec. 7, 1886.
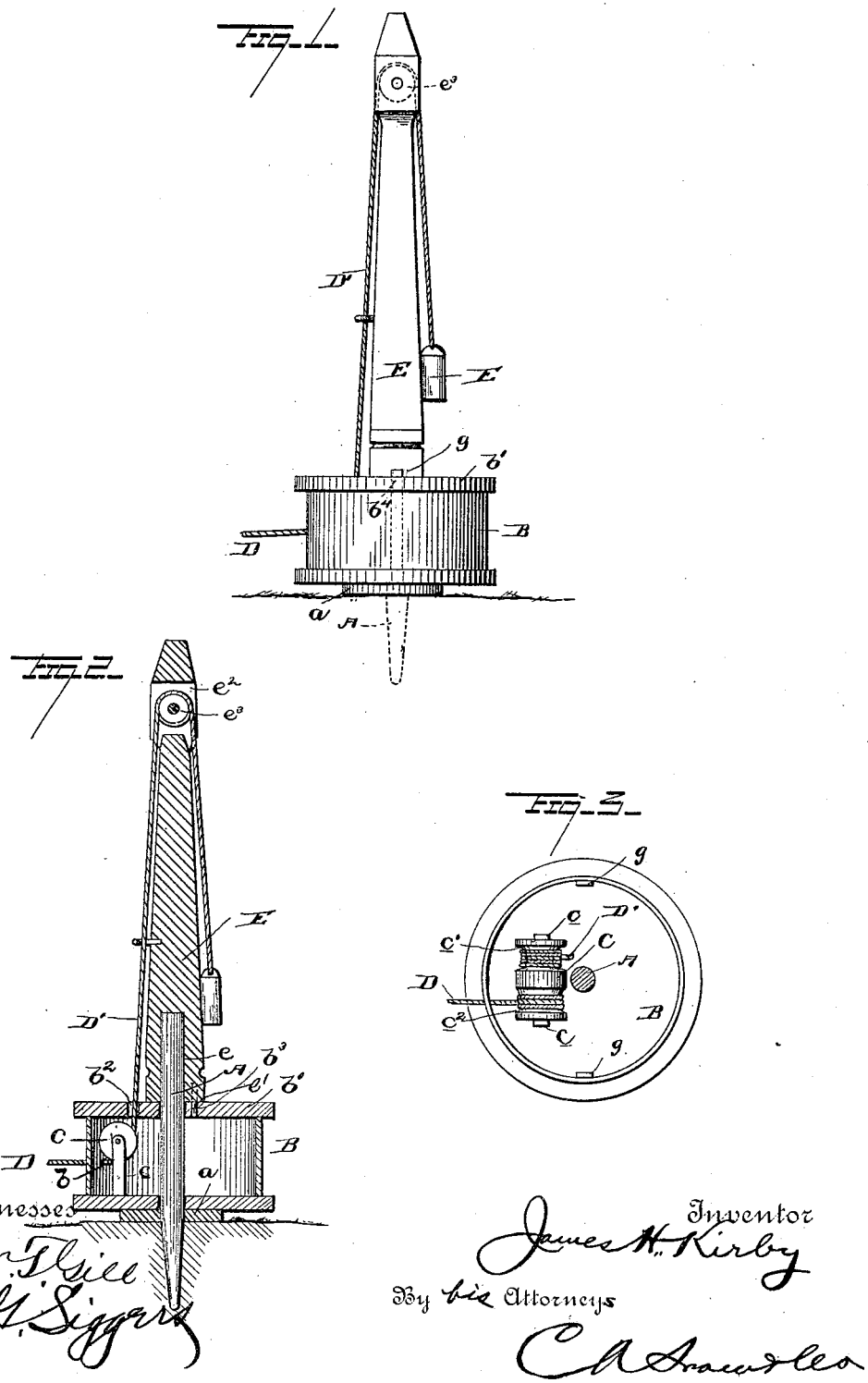
Witnesses:
Inventor
James H. Kirby
By his Attorneys

UNITED STATES PATENT OFFICE.

JAMES HENRY KIRBY, OF COAL VALLEY, WEST VIRGINIA.

TETHER.

SPECIFICATION forming part of Letters Patent No. 353,750, dated December 7, 1886.

Application filed July 29, 1886. Serial No. 209,461. (No model.)

*To all whom it may concern:*

Be it known that I, JAMES HENRY KIRBY, a citizen of the United States, residing at Coal Valley, in the county of Fayette and State of West Virginia, have invented a new and useful Improvement in Tethers, of which the following is a specification.

This invention relates to devices for confining animals within certain bounds while feeding in unfenced pastures; and the object of the invention is to provide means for keeping the tethering rope or cord always tight, and thereby prevent any injury to the animal by entanglement in a slack tethering-rope.

To the above purpose my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of the improved tether. Fig. 2 is a vertical section of the same. Fig. 3 is a plan view of the revolving case with its top removed.

In the said drawings, A designates a pole or rod, which is set firmly in the ground in a vertical position. At its lower part this pole or rod carries a disk, $a$, which, when the rod A is in position, rests upon the ground. Upon the disk $a$ rests a casing, B, through the bottom of which extends the rod or pole A sufficiently loose to permit the said casing to revolve freely upon the pole or post A. Upon the bottom of the casing B, and to one side of its center, is placed a pair of standards, $c$, between which is journaled a horizontal drum, C. This drum is formed with two circumferential grooves, $c'$ $c^2$, the depth of the groove $c'$ being greater than that of the groove $c^2$. This renders one end of the drum larger than the other, so that a rope wound upon the small end will cause the larger end to wind or unwind a rope attached to it at a much greater speed than the rope attached to the small end. A hole, $b$, is made in the side of casing B contiguous to the drum C, and into this hole runs the tethering-rope D, which is wound in the shallower groove, $c^2$, of said drum. The top $b'$ of casing B is provided with a central hole for the passage of pole or rod A, and also with a hole, $b^2$, for the passage of a cord or rope, D', the opposite end of which is counterweighted, as hereinafter described.

E designates a pole or staff, the lower end of which is provided with a socket, $e$, to receive the upper end of rod A, and also with a downwardly-extending pin, $e'$, which enters a hole, $b^3$, in the top $b'$, so that said staff shall turn upon rod A with the casing B. At its upper end the staff E is formed with an opening, $e^2$, in which is journaled a peripherally-grooved pulley, $e^3$. The cord D' runs over this pulley $e^3$, and to the lower end of said cord is attached a counter-weight, F. The top $b'$ of casing B is attached to said casing by vertical bars $g$, extending upward from the inner sides thereof and entering holes $b^4$ in said top, the arrangement being such that the top must turn rigidly with the casing.

From the above description it will be seen that the animal is free to travel completely around the device, and as far from it as the length of the rope or cord D will permit, without affecting the operation of the device in keeping said rope tight, and that when the animal travels toward the device the slack of rope D will be continuously drawn in. As the animal moves away from the device, the counter-weight F will be raised, and as the animal moves toward the device the said weight will fall and wind up the slack of rope D, said ropes D D' being wound oppositely upon drum C.

The tether-rope being wound upon the large end of the drum, and the weighted rope being wound upon the small end thereof, as before described, it follows that owing to the increased speed with which the tether-rope is coiled or uncoiled, as compared with the weighted rope, the latter does not have to move so far as the former, and consequently the tethering device need not be very high in order to give the tethered animal considerable range.

Having thus described my invention, I claim—

1. The combination, with a rod or pole carrying a revoluble casing and a staff set upon and turning with said casing, of a winding-drum in said casing, a pulley upon said staff, a tethering-cord wound upon said drum, a cord wound oppositely upon said drum and running over said pulley, and a weight attached to said cord, substantially as set forth.

2. The combination, with staff A, carrying disk $a$, casing B, turning freely upon said staff, and having the hole $b$ and bars $b^4$, the top $b'$, having holes $b^2$ $b^3$ $b^4$, and the staff E, having socket $e$, pin $e'$, and pulley $e^3$, of the drum C, mounted upon standards $c$, having deep groove $c'$ and shallow groove $c^2$, the ropes D D', oppositely wound in said grooves, and the weight F, attached to cord D', as specified.

In testimony that I claim the foregoing as my own I have hereto affixed my signature in presence of two witnesses.

JAMES HENRY KIRBY.

Witnesses:
FOSTER HART,
G. W. CHAMP.